Dec. 5, 1933.  J. D. BUTLER  1,937,944
MANUFACTURE OF SULPHITES
Filed June 6, 1930
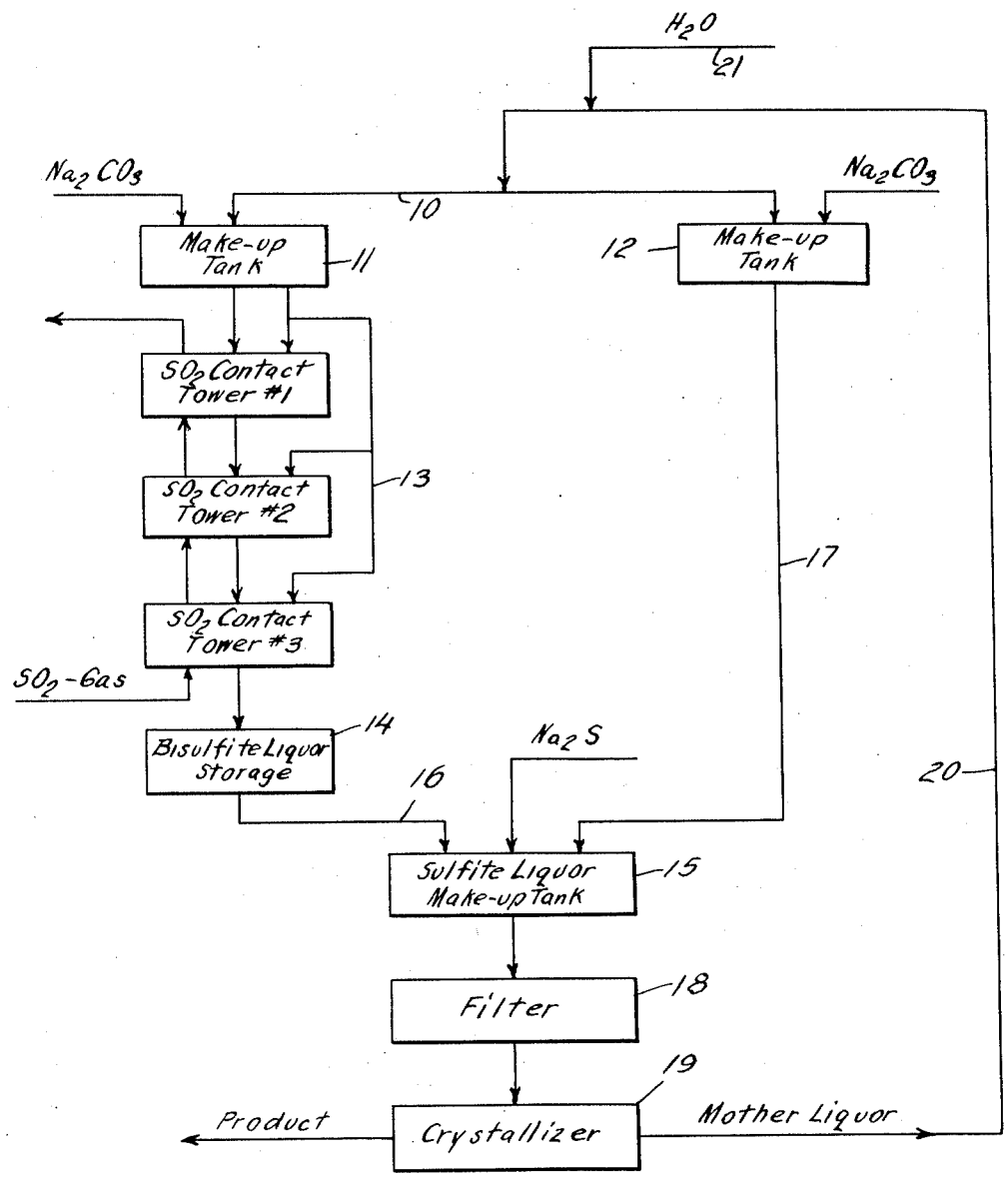
INVENTOR
James D. Butler
BY
ATTORNEY Patented Dec. 5, 1933

1,937,944

UNITED STATES PATENT OFFICE 1,937,944

MANUFACTURE OF SULPHITES

James D. Butler, Baltimore, Md., assignor to General Chemical Company, New York, N. Y., a corporation of New York Application June 6, 1930. Serial No. 459,483

19 Claims. (Cl. 23—129)

This invention relates to the manufacture of sulphites, particularly alkali sulphites. Generally, the invention is directed to a process for purifying sulphite liquors, and more particularly to a process for the purification of such liquors so as to facilitate the production of sodium sulphite of a high degree of purity.

The principal object of the invention resides in the provision of a process for making anhydrous sodium sulphite, the resulting product of which gives a clear solution in water, is snow-white in appearance, high in sulphite, low in sulphate, and contains very little insoluble matter.

Considerable research work has been done in an effort to develop a process for making alkali sulphites, the product of which would give a clear solution in water. In many of the arts, it is highly desirable, if not entirely essential, to utilize an alkali sulphate water solution which is perfectly clear. In some instances, clear water solutions of sodium sulphite have been obtained from prior commercial sodium sulphite, but it has not been possible to predict with certainty that any particular sodium sulphite would produce a clear solution in water. As a general rule such solutions have been turbid, and as far as I am aware, it has not been known what was the cause of the cloudiness, although it has been thought that impurities of some nature, either in the raw materials or formed during the manufacture of the sodium sulphite crystals, were the basis of the difficulty.

It has been found that the turbidity of water solutions of sodium sulphite is caused by the presence of small amounts of metal salt impurities, such as of iron and lead and other metals, in the sodium sulphite liquor, which impurities in prior methods of manufacture, have been carried through the process of making the sodium sulphite and have been included in the finished product. According to the present invention, I am enabled to produce sodium sulphite which gives a clear solution when dissolved in water, and, broadly stated, I accomplish the end in view by treating the sodium sulphite liquors with a soluble sulphide under conditions as specified hereinafter.

The drawing illustrates a flow sheet of one application of the improved process.

In the drawing, the numeral 10 represents a header by means of which mother liquor from which sodium sulphite crystals have been separated is fed into the make-up tanks 11 and 12. Sulphur dioxide contact towers #1, #2 and #3 are connected in series, as indicated, with the discharge of the make-up tank 11. The numeral 13 represents a by-pass line by which liquor from the make-up tank 11 may be fed into any one of the contact towers. It will be understood that each of the contact towers is provided with suitable means for circulating sulphur dioxide gas therethrough in a direction counter-current to the flow of the liquor.

The tower #3 discharges bisulphite liquor into the storage tank 14 which in turn discharges into the make-up tank 15 through a suitable valve controlled line 16. The soda ash solution make-up tank 12 is also connected to the tank 15 through the line 17. After treatment in tank 15, as hereinafter specified, the finished sulphite liquor is conducted successively through the filter 18, and the crystallizer 19 in which the crystals of sodium sulphite are formed and separated from mother liquor. The mother liquor is pumped into the header 10 through a suitable connection 20. The numeral 21 indicates a water supply for introducing water to the system as needed. It will be understood that the separate units of the apparatus are of conventional and well-known design, and include the usual accessories such as pumps, agitators in the tanks, steam lines for introducing steam in the apparatus where needed, etc.

For the purpose of explaining the invention, and presenting one specific embodiment thereof, the following mode of operation is given. Except as where indicated, it will be understood that mention of specific quantities, temperatures, concentrations, degrees of acidity, alkalinity. etc. is made by way of example only, and not by way of limitation.

The bisulphite liquor in the storage tank 14 is made up as follows: Approximately 2400 gallons of mother liquor which has been drawn off from the crystallizer 19 is pumped into the make-up tank 11 through the pipe line 20 and the header 10. The stirring mechanism in the tank 11 is started, and live steam turned into the liquor. Soda ash ($Na_2CO_3$) is then added as the batch is agitated, until the batch tests about 35° Bé. at a temperature ranging from about 135° to 145° F. If the process is just being started, this batch is pumped into the $SO_2$ contact tower #3 through the by-pass line 13, and additional batches are similarly made up in the tank 11 and fed into towers #1 and #2. The pumps in the tower circulating systems are then started up and the liquors are circulated through their respective towers in the presence of $SO_2$ gas. The liquor in tower tank #3 is circulated therethrough until practically all the CO₂ has passed off, and practically all the carbonate and bicarbonate has been converted to the bisulphite or sulphite. This end point may be readily determined when the liquor is in such condition that a 10 cc. sample requires 12-14 cc. of $N/1H_2SO_4$ to react neutral to methyl orange. It will be understood that the liquor contains a predominating quantity of the bisulphite and small amounts of the sulphite, and that the bisulphite is neutral to methyl orange, whereas the sulphite is basic to the same indicator.

At this point the liquor in tower #3 is finished, and is of a concentration of about 37°-38° Bé. at a temperature around 150° F. This liquor is then pumped into the bisulphite liquor storage tank 14. The liquors in tower tanks #2 and #1 are then pumped over into tanks #3 and #2 respectively, and another batch is fed into tower #1 from the tank 11. The process in the tower tanks #1, #2 and #3 consists of a progressive movement of batches of liquor against a counter-current flow of SO₂ gases, the liquor circulating in the towers until the liquor in tower #3 fulfills the requirements for finished bisulphite liquor, at which time it is discharged into the storage tank 14.

A soda ash solution is made up in the tank 12 as follows: Approximately 2400 gallons of mother liquor are fed into the tank 12 from the header 10. If the supply of mother liquor is at any time insufficient, fresh water may be introduced into the system through the connection 21. The agitating mechanism in the tank 12 is started, and live steam turned into the liquor. Soda ash is then added slowly as the liquor is agitated, so as to allow time for complete solution, the addition being continued until the batch in the tank is clear and tests around 35° Bé. at about 150° F.

The finished sodium sulphite liquor is made up in the tank 15 by neutralizing the bisulphite liquor from the tank 14 with the soda ash solution from the tank 12 as follows: Approximately 2000 gallons of the bisulphite liquor from the tank 14 is pumped into the make-up tank 15. The stirring mechanism is started, and live steam turned on. The bisulphite liquor is then neutralized by pumping in soda ash solution from the tank 12 through the line 17. When the bisulphite liquor has become nearly neutralized, that is, for example, when 10 cc. of the solution require 0.5 cc. N/1NaOH to react neutral to phenolphthalein, the addition of soda ash emulsion from tank 12 is stopped. It will be understood that the bisulphite reacts acid to phenolphthalein and that sodium carbonate reacts basic to the same indicator. The agitating mechanism in tank 15 is then permitted to operate until no more CO₂ is evolved from the mixture in tank 15. Then, more soda ash solution is added until the batch in the tank 15 tests about 0.2 cc. on the alkaline side; that is, when a 10 cc. sample requires 0.2 cc. of $N/1H_2SO_4$ to react neutral to phenolphthalein. The steam in the tank 15 is then turned off, and the stirring mechanism stopped. At this stage the finished liquor is of a concentration of about 35° Bé. at 165° to 170° F. At this point in the process, the finished sulphite liquors are treated with sodium sulphide (Na₂S) for the purpose of precipitating and facilitating the subsequent removal of impurities such as iron and lead and other metals which, as heretofore explained, have been the essential cause of the turbidity in water solutions of sodium sulphite manufactured according to prior processes.

According to one mode of procedure, the treatment of the finished sulphite liquor in the tank 15 consists in the addition of sodium sulphide, in order to precipitate iron, lead and other metallic impurities, in amounts of sodium sulphite ranging from about 0.0001 to about 0.015 pounds per gallon sulphite liquor so that all or substantially all of the metal impurities are precipitated, and substantially no thiosulphate is formed and little if any free sodium sulphide remains present in the finished sulphite liquor. The exact quantity of sodium sulphide added of course depends upon the amount of impurities present in any specific batch of the finished sulphite liquor. Any quantity of sodium sulphide up to the theoretical amount will effect an improvement in the product, and a good product may be secured when a theoretical quantity of sulphide is utilized. However, more satisfactory results are obtained when an excess over the theoretical amount of sulphide is employed, particularly good results having been secured where an excess of about 5% over the theoretical amount of sulphide was used. The required quantity of sodium sulphide is dissolved in water, and poured into the finished batch in the tank 15. The precipitate coagulates, and settles almost immediately. The batch is agitated for a few minutes and then allowed to run through the filter 18 and into the crystallizer 19. After the sodium sulphite crystals have been formed and removed from the liquor in the crystallizer 19, the mother liquor is run off through the line 20, and conducted to the make-up tanks 11 and 12 to facilitate repetition of the process. The resulting anhydrous sodium sulphite produced from the crystals separated from the liquor in the crystallizer 19 is snow-white in appearance, high in sulphite, low in sulphate, gives a clear solution in water, and contains very little insoluble matter.

The improved method for purification may also be successfully applied to treatment of the mother liquor after removal of the same from the crystallizer 19, as well as by the process described of treatment of the finished sulphite liquor in the make-up tank 15. In the event that purification is to be effected by treatment of the mother liquor, the quantity of sodium sulphide to be added is determined by the quantity of impurities contained in the liquor, and the addition of the sodium sulphide is made in the form of a water solution as previously noted in connection with the treatment of the finished liquors in the tank 15. However, purification by treatment of the mother liquors is not as desirable nor as efficient as the purification by treatment of the finished liquor in the tank 15 because of the time required to form a properly coagulated and filterable precipitate. It requires usually somewhat in excess of three times as long to properly form and flocculate a precipitate in the mother liquors than when the finished liquor is treated as previously described. Where purification is carried out in the make-up tank 15, usually not more than five to ten minutes is required for the formation and filtration of the precipitate.

The process is adaptable for the treatment of acid, neutral or alkaline liquors, though in practice more satisfactory results have been obtained where the neutralization in the tank 15 is controlled as described so as to produce a finished liquor having an alkalinity sufficient to neutralize from 0.2 to 0.4 cc. of $N/1H_2SO_4$ per 10 cc. of liquor, using phenolphthalein as an indicator. An alkalinity beyond 3 cc., that is, where 10 cc. of liquor requires 3 cc. of $N/1H_2SO_4$ to neutralize, although not a limit, would be sufficient to cause the retention of an excess sulphide added in the liquor. Further, high alkalinity is also conducive to filtering difficulties. An acidity greater than 3 cc. is not desirable on account of the solubility of the precipitated sulphides, and also on account of the formation of thiosulphate. The acidity, for efficient operation of the process, should not be so great as to decompose the sodium sulphide, cause evolution of $H_2S$ from liquor and hence reduce the effectiveness of the sodium sulphide. Other soluble sulphides may be used instead of sodium sulphide, such as sulphide of potassium or hydrogen sulphide.

In the appended claims the term "finished liquor" denotes a liquor as obtained in the tank 15 prior to the formation and removal of sodium sulphite crystals as distinguished from the mother liquor remaining after the formation and removal of the crystal product.

I claim:

1. The process of purifying sulphite liquors containing impurities forming insoluble precipitates which comprises adding a water soluble sulphide thereto.

2. The process of purifying sulphite liquors containing impurities forming insoluble precipitates which comprises adding sodium sulphide thereto.

3. The process of purifying sulphite liquors containing impurities forming insoluble precipitates which comprises adding a solution of sodium sulphide thereto.

4. The process of purifying a liquor containing sodium sulphite and impurities forming insoluble precipitates which comprises adding a water soluble sulphide thereto.

5. The process of purifying a liquor containing sodium sulphite and impurities forming insoluble precipitates which comprises adding sodium sulphide thereto.

6. The process of purifying a liquor containing sodium sulphite and impurities forming insoluble precipitates which comprises adding a solution of sodium sulphide thereto.

7. In the process of making alkali sulphite comprising the steps of forming a bisulphite liquor, and adding alkali carbonate thereto to form an alkali sulphite liquor, the improvement which comprises precipitating impurities by adding a sulphide to the alkali sulphite liquor.

8. In the process of making sodium sulphite comprising the steps of forming a bisulphite liquor, and adding a sodium carbonate solution thereto to form a sodium sulphite liquor, the improvement which comprises adding a water solution of sodium sulphide to said sodium sulphite liquor to precipitate impurities, and then separating the precipitate from the sodium sulphite liquor.

9. In the process of making sodium sulphite, the step which comprises adding sodium sulphide to a finished sulphite liquor containing impurities forming insoluble precipitates.

10. In the process of making sodium sulphite, the step which comprises adding a water solution of sodium sulphide to a finished sulphite liquor containing impurities forming insoluble precipitates.

11. The process of purifying sulphite liquors containing metal salt impurities which comprises adding thereto soluble sulphide in an amount at least equal to a chemical equivalent of the contained impurities.

12. The process of purifying sulphite liquors containing metal salt impurities which comprises adding thereto sodium sulphide in an amount in excess of a chemical equivalent of the contained impurities.

13. In the process of making sodium sulphite, the steps which comprise forming a sodium sulphite liquor within the range of 3 cc. alkalinity and 3 cc. acidity, and then adding sodium sulphide to the sulphite liquor.

14. In the process of making sodium sulphite, the steps which comprise forming a sodium sulphite liquor within the range of 3 cc. alkalinity and 3 cc. acidity and containing metal salt impurities, and then adding sodium sulphide to the sulphite liquor in an amount at least equal to a chemical equivalent of the contained impurities.

15. In the process of making sodium sulphite, the steps which comprise forming a sodium sulphite liquor within the range of 3 cc. alkalinity and 3 cc. acidity and containing metal salt impurities, and then adding sodium sulphide to the sulphite liquor in an amount in excess of a chemical equivalent of the contained impurities.

16. In the process of making sodium sulphite including the step of forming an alkaline sodium sulphite liquor containing impurities forming insoluble precipitates, the improvement which comprises adding sodium sulphide thereto.

17. In the process of making sodium sulphite including the step of forming an alkaline sodium sulphite liquor containing metal impurities, the improvement which comprises adding sodium sulphide to the sulphite liquor in an amount at least equal to a chemical equivalent of the contained impurities.

18. In the process of making sodium sulphite including the step of forming an alkaline sodium sulphite liquor containing metallic impurities, the improvement which comprises adding sodium sulphide to the sulphite liquor in an amount in excess of a chemical equivalent of the contained impurities.

19. In the process of making sodium sulphite comprising the steps of forming a bisulphite liquor, and adding a sodium carbonate solution to such liquor to form an alkaline sodium sulphite liquor containing impurities, the improvement which comprises adding sodium sulphide to said sodium sulphite liquor in an amount in excess of a chemical equivalent of the said impurities to precipitate such impurities, separating the precipitate from the liquor, and then crystallizing and separating the sodium sulphite from the excess liquor.

JAMES D. BUTLER.